United States Patent
Oh et al.

(10) Patent No.: US 10,684,169 B2
(45) Date of Patent: Jun. 16, 2020

(54) OPTICAL ANALYSIS DEVICE USING MULTI-LIGHT SOURCE STRUCTURE AND METHOD THEREFOR

(71) Applicant: Korea Institute of Ocean Science & Technology, Ansan-si, Gyeonggi-do (KR)

(72) Inventors: Sang Woo Oh, Sejong (KR); Moon Jin Lee, Daejeon (KR)

(73) Assignee: Korea Institute of Ocean Science & Technology, Ansan-si, Gyeonggi-do (KR)

( * ) Notice: Subject to any disclaimer, the term of this patent is extended or adjusted under 35 U.S.C. 154(b) by 0 days.

(21) Appl. No.: 16/348,728

(22) PCT Filed: Sep. 8, 2017

(86) PCT No.: PCT/KR2017/009904
§ 371 (c)(1),
(2) Date: May 9, 2019

(87) PCT Pub. No.: WO2018/097458
PCT Pub. Date: May 31, 2018

(65) Prior Publication Data
US 2019/0285472 A1    Sep. 19, 2019

(30) Foreign Application Priority Data
Nov. 22, 2016 (KR) .................. 10-2016-0155690

(51) Int. Cl.
*G01J 3/10* (2006.01)
*G01J 3/02* (2006.01)
*G01J 3/443* (2006.01)

(52) U.S. Cl.
CPC ............. *G01J 3/10* (2013.01); *G01J 3/0202* (2013.01); *G01J 3/443* (2013.01); *G01J 2003/102* (2013.01)

(58) Field of Classification Search
CPC ............ G01J 3/10; G01J 3/443; G01J 3/0202; G01N 21/03
(Continued)

(56) References Cited

U.S. PATENT DOCUMENTS

| 5,602,647 A    * | 2/1997 | Xu ..................... G01N 21/0303 356/246 |
| 10,324,023 B1 * | 6/2019 | Scheeline ............. G01N 21/31 |
| 2019/0257742 A1 * | 8/2019 | Scheeline ................. G01J 3/18 |

FOREIGN PATENT DOCUMENTS

| JP | S58-86555 U  | 6/1983 |
| JP | H05-322658 A | 12/1993 |

(Continued)

OTHER PUBLICATIONS

International Search Report PCT/ISA/210 for International Application No. PCT/KR2017/009904 dated Dec. 28, 2017.
(Continued)

*Primary Examiner* — Roy M Punnoose
(74) *Attorney, Agent, or Firm* — Harness, Dickey & Pierce, P.L.C.

(57) ABSTRACT

The present invention relates to an optical analysis device using a multi-light source structure, which allows acquisition of an optimized measurement result by adjusting the number of light sources depending on a concentration of an object to be measured, such as ocean spilled oil, etc., and a method therefor. The optical analysis device using a multi-light source structure may comprise: a multi-light source unit including multiple light source units each having a light source which is selectively illuminated, in order to adjust an amount of light depending on a concentration of an object to
(Continued)

be measured; a cuvette unit including a cuvette in which an object to be measured is disposed, wherein the cuvette has a prism shape and has as many faces as the number of the light source units plus one, the light source units faces the faces, respectively, and reactive light generated from the object to be measured is emitted through the remaining one face; a light sensor unit for detecting the reactive light emitted through the cuvette; and a control unit for controlling illumination of the light source units configuring the multi-light source unit.

7 Claims, 13 Drawing Sheets

(58) Field of Classification Search
USPC .................................. 356/346, 246, 436
See application file for complete search history.

(56) References Cited

FOREIGN PATENT DOCUMENTS

| | | | |
|---|---|---|---|
| JP | 2002511580 | A | 4/2002 |
| JP | 2003329585 | A | 11/2003 |
| JP | 2009092600 | A | 4/2009 |
| JP | 2009-198190 | A | 9/2009 |
| KR | 100789724 | B1 | 1/2008 |
| KR | 101229372 | B1 | 2/2013 |
| KR | 2013-0084333 | A | 7/2013 |
| KR | 2014-0029410 | A | 3/2014 |
| KR | 2016-0031783 | A | 3/2016 |

OTHER PUBLICATIONS

Korean Office Action for Korean Patent Application No. 10-2016-0155690 dated Nov. 21, 2017 and english translation thereof.
Korean Decision to Grant for Korean Patent Application No. 10-2016-0155690 dated Mar. 20, 2018 and english translation thereof.

* cited by examiner

OPTICAL ANALYSIS DEVICE USING MULTI-LIGHT SOURCE STRUCTURE AND METHOD THEREFOR

CROSS-REFERENCE TO RELATED APPLICATIONS

This application is a national phase under 35 U.S.C. § 371 of PCT International Application No. PCT/KR2017/009904 which has an International filing date of Sep. 8, 2017, which claims priority to Korean Patent Application No. 10-2016-0155690, filed Nov. 22, 2016, the entire contents of each of which are hereby incorporated by reference.

TECHNICAL FIELD

The present invention relates to an optical analysis device using a multi-light source structure which emits light for an object to be measured and detects reaction light in the object to be measured occurring after the light is thereon. More particularly, the present invention relates to an optical analysis device using a multi-light source structure, which possibly obtains an optimized measurement result by adjusting a number of light sources according to a concentration of an object to be measured, such as an oil spilled on the ocean, etc., and a method therefor.

BACKGROUND ART

In general, an optical analysis device analyzing and measuring characteristics of light such as light intensity or phase reacted with an object to be measured, phase, etc. may determine a state of the object to be measured such as amount, type, etc. according to reaction light. As such an optical analysis device, an absorbance analysis device obtaining a result by quantifying an amount of light that is absorbed and partially passes according to an aspect of an object to be measured, a spectrum analysis device obtaining a result by using an amount of light that is passed or absorbed according to a wavelength range, a fluorescence analysis device using a phenomenon that is excited by ultraviolet wavelength and emits light, etc. are used.

As an example of the above optical analysis device, Korean Patent Application Publication No. 10-2014-0029410 discloses "Method and apparatus for the measurement of the mass fraction of water in oil-water mixtures", Korean Patent No. 10-0789724 discloses "Method and apparatus for monitoring oil oxidation in real-time by measuring fluorescence", and Korean Patent No. 10-1229372 discloses "System for detecting excluded oil and method thereof".

As described above, in a conventional optical analysis device analyzing an amount (concentration) of an object to be measured, in order to optimize a result value according to a measurement result, that is, in order to maximally obtain a measurement result or to extend a measurement range where a small amount of a sample is measured, as a state of reaction light varies according to an amount size of an object to be measured, a method of adjusting a temporal and spatial range that reacts with light according to a characteristic (type, amount, etc.) of the object to be measured, a method of adjusting sensitivity of an optical sensor measuring reaction light, and a method of adjusting intensity of a light source are reflected in a measurement system.

Specifically, first, a method of adjusting a temporal and spatial range that reacts with light is a method that is mainly used when measuring a small amount of a sample, and uses a method of increasing an optical path length so as to increase a space and a time which pass or react with an object to be measured. When an optical path length is increased, a minimum measurement limit capable of measuring a small amount of a sample is increased, as well as, a measurement resolution is also increased in a state such where reaction light intensity varies according to a sample state or small change in amount thereof. However, when an amount of a measurement sample is increased, reaction light reaches a saturation state, and thus additional process of physically decreasing an optical path length is required for measuring a high concentration. Accordingly, a measurement range is limited (narrow) when using a measurement device using a single optical path length.

Second, a method of adjusting sensitivity of an optical sensor measuring reaction light is a method used when a result state of reaction light according to an amount of a sample or sample type is provided, and is a method of setting the sensitivity of the optical sensor to a range where reacted light is received, and measuring the same. The above method requires additional optical part or electric part so as to measure an object to be measured which exceeds measurement sensitivity of an optical sensor since a measurement range is determined according to the measurement sensitivity (adjustable sensitivity) of the optical sensor. For example, in order to measure light intensity lower than measurement sensitivity, a method of amplifying a measurement signal is used. However, in a general optical sensor, an additional circuit for amplifying a current or signal is required since a measurement result is converted to an electric signal (current or voltage). However, in a case of a minute current, a measurable limit value becomes small even though the signal is amplified since a signal-to-noise ratio of the measured signal is small.

Third, a method of adjusting intensity of a light source that induces an optical phenomenon of an object to be measured in an optical measurement device is a method of relatively increasing a size of an optical signal measured by irradiating a higher amount of light to obtain a high signal for a small amount of an object to be measured. The above method may adjust a measurement area (range) without requiring an additional optical part, an electric amplifier, a structure adjusting an optical path length. However, when using a single light source, a measurement range may be adjusted but adjusting an amount of light is limited. Accordingly, the range that is fundamentally measured is limited. In addition, an accurate measurement is available when an amount of light of the light source which is fundamentally emitted has to be fixed so as to obtain a quantitative result by dividing an optical signal varying according a measurement amount, and thus a reaction value (characteristics of fluorescent light) of an object to be measured which reacts according to an amount of adjusted light has to be provided in advance when the amount of light is adjusted for expanding a measurement range.

DISCLOSURE

Technical Problem

Accordingly, the present invention has been made keeping in mind the above problems occurring in the prior art, and an objective of the present invention is to provide an optical analysis device using a multi-light source structure, the device being capable of, when performing an optical analysis for an object to be measured, selectively applying a number of light sources, and thus a measurement range is easily extended according to a concentration of the object to be measured, and an optimized measurement result is obtained according to a measurement area by emitting optimized measurement light, and a method therefor.

Technical Solution

In order to achieve the above-mentioned object, an optical analyzing device using a multiple light source structure of the present invention includes:

a multi-light source unit including a number of light source units, each light source unit including a light source selectively emitting light according to a concentration of an object to be measured so as to adjust an amount of light;

a cuvette unit including a cuvette having a pillar form, the pillar having one more surface than the number of light source units, facing to the number of light source units at lateral surfaces thereof, and storing the object to be measured where reaction light occurring in the object to be measured passes through the remaining one lateral surface thereof;

an optical sensor unit detecting the reaction light output through the cuvette; and a controller controlling the light source units constituting the multi-light source unit to emit light.

The multi-light source unit may include two light source units, the cuvette may be formed in a triangular pillar, and the controller may be configured to:

control the multi-light source unit such that two light source units emit light for a low concentration of the object to be measured so as to generate reaction light by the object to be measured, a single light source unit emits light for a high concentration of the object to be measured so as to generate reaction light by the object to be measured, and thus a two-stage measurement is performed where the reaction light has linearity in a low concentration area and a high concentration area of the object to be measured.

The multi-light source unit may include three light source units, the cuvette may be formed in a quadrangular pillar, and the controller may be configured to:

divide the object to be measured into a low concentration, an intermediate concentration, and a high concentration; and to control the multi-light source unit such that three light source units emit light for the low concentration of the object to be measured so as to generate reaction light by the object to be measured, two light source units emit light for the intermediate concentration of the object to be measured so as to generate reaction light by the object to be measured, a single light source unit emits light for the high concentration of the object to be measured so as to generate reaction light of the object to be measured, and thus a three-stage measurement is performed where the reaction light is measured in three concentration sections, and the measured reaction light has linearity in the three concentration sections.

The multi-light source unit may include four light source units, the cuvette may be formed in a pentagonal pillar, and the controller may be configured to:

divide the object to be measured into a lowest concentration, a low concentration, an intermediate concentration, and a high concentration; and to control the multi-light source unit such that four light source units emits light for the lowest concentration of the object to be measured so as to generate reaction light by the object to be measured, three light source units emits light for the low concentration of the object to be measured so as to generate reaction light by the object to be measured, two light source units emits light for the intermediate concentration of the object to be measured so as to generate reaction light by the object to be measured, a single light source unit emits light for the high concentration of the object to be measured so as to generate reaction light of the object to be measured, and thus a four-stage measurement is performed where the reaction light is measured in four concentration sections, and the measured reaction light has linearity in the four concentration sections.

In order to achieve the above-mentioned object, an optical analysis method using multi-light source structure of the present invention, wherein the method is performed by an optical analysis device including a multi-light source unit, a cuvette unit, an optical sensor unit, and a controller, includes:

light emission setting for each concentration of dividing, by the controller, a measurement concentration area of an object to be measured, and selecting a light source unit emitting light for each concentration; and performing, by the controller, an optical analysis by controlling the light source unit to sequentially emit light according to the light emission setting for each concentration.

In the light emission setting for each concentration, a case where reaction light is saturated may be set as a high concentration, and the concentration area may be uniformly divided into a number of light source units.

In the performing of the optical analysis, when the uniformly divided concentration areas is n, a number n of light source units emits light for a lowest concentration, the number n is decreased by one depending one each area, and a single light source unit emits light for a high concentration where reaction light is saturated, and thus the optical analysis is performed by using the number n of light source units differing for each concentration area of the object to be measured.

Advantageous Effects

An optical analysis device using a multi-light source structure which has the above configuration of the present invention can provide effect of measuring a large measurement area by overcoming limitation of the conventional optical analysis device having limitation in a measurement area.

MODE FOR INVENTION

In the following description, if detailed description about well-known functions or configurations may make the subject matter of the disclosure unclear, the detailed description will be omitted.

Since various variations may be performed on the exemplary embodiments according to the concept of the present invention and the embodiments of the present invention can be realized in a wide range of varied forms, specific exemplary embodiments of the present invention will be described herein in detail with reference to the appended drawings of the exemplary embodiments of the present invention. However, the present invention will not be limited only to the specific exemplary embodiments which are disclosed herein. In addition, the word "exemplary" is used herein to mean "serving as an example, instance, or illustration." Any aspect described herein as "exemplary" is not necessarily to be construed as preferred or advantageous over other aspects.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Other expressions for describing relationships between elements, for example, "between" and "immediately between" or "neighboring" and "directly neighboring" may also be understood likewise.

The terminology used in the specification of the present invention is for the purpose of describing particular embodiments only and is not intended to limit the invention. As used in the specification and the appended claims, the singular forms "a", "an", and "the" are intended to include the plural forms as well, unless context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Hereinafter, the present invention will be described in more detail with reference to the accompanying drawings showing embodiments of the present invention.

Figure 1:
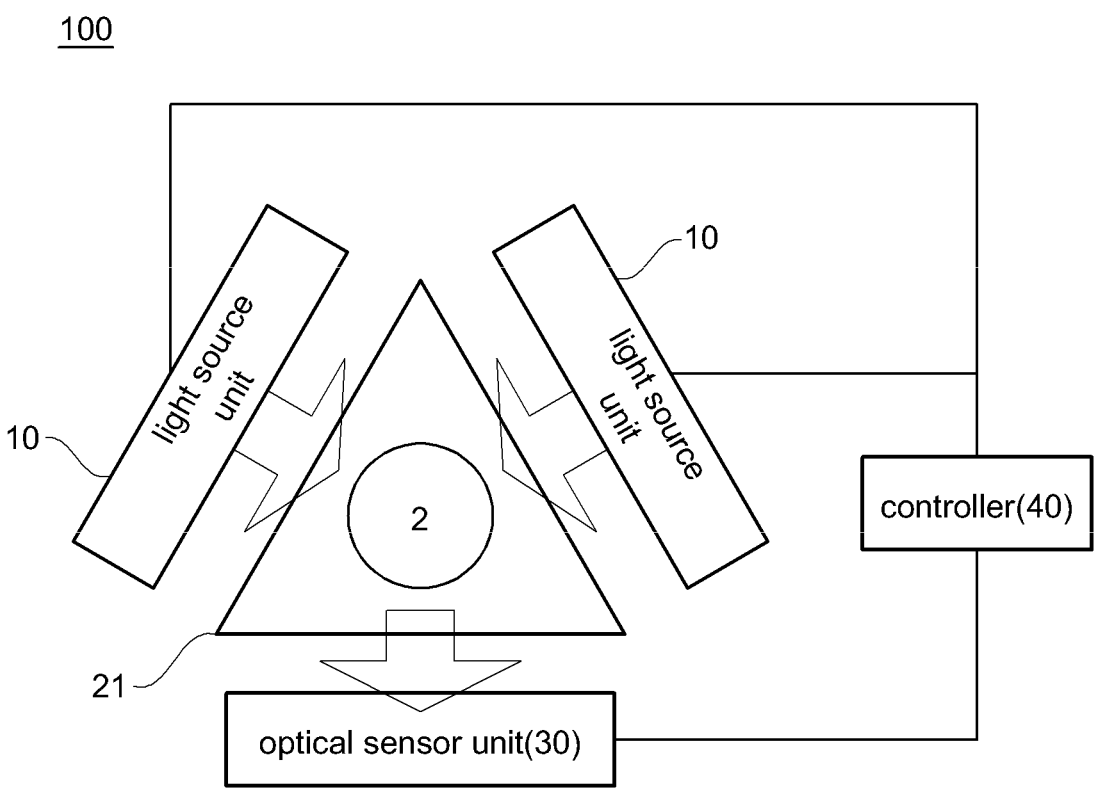
FIG. 1 is a block diagram showing a two-stage light emitting optical analysis device 100 according to an embodiment of the present invention.

FIG. 1 is a block diagram showing a two-stage light emitting optical analysis device 100 according to an embodiment of the present invention.

As shown in FIG. 1, the two-stage light emitting optical analysis device 100 is configured with a multi-light source unit having a pair of light source units 10, a triangular pillar cuvette 21 in which an object to be measured 2 is stored, an optical sensor unit 30, and a controller 40.

The light source unit 10 is configured with, when necessary, a light source such as light emitting diode (LED), etc., an optical lens, an opening, an excitation filter, etc., and is configured to generate and emit light having light characteristics proper for measuring an object to be measured.

The triangular pillar cuvette 21 is made of a triangular pillar that transmits light.

The optical sensor unit 30 is configured to detect incident light by including, when necessary, an opening blocking external light and enabling reaction light that is generated in the object to be measured to be incident, an optical lens focusing the incident light, a light emitting filter required when performing a fluorescence measurement, and a photo diode for detecting light.

The controller 40 is configured to, in order to generate reaction light by an object to be measured 2, control the pair of light source units 10 constituting the multi-light source unit such that two light source units emit light for a low concentration of the object to be measured 2, a single light source unit emits light for a high concentration of the object to be measured, and thus a three-stage measurement is performed where the reaction light has linearity in a low concentration area and a high concentration area of the object to be measured.

The light source unit 10 having the above configuration is installed to face two lateral surfaces of the triangular pillar cuvette 21, and the optical sensor unit 30 is installed to face the remaining lateral surface of the cuvette 21. In addition, the controller 40 is configured to control light emission of the light source units 10 by being connected thereto, and to perform a light analysis according to two-stage concentration areas of the object to be measured by receiving an optical detection signal of the optical sensor unit 30.

Figure 2:
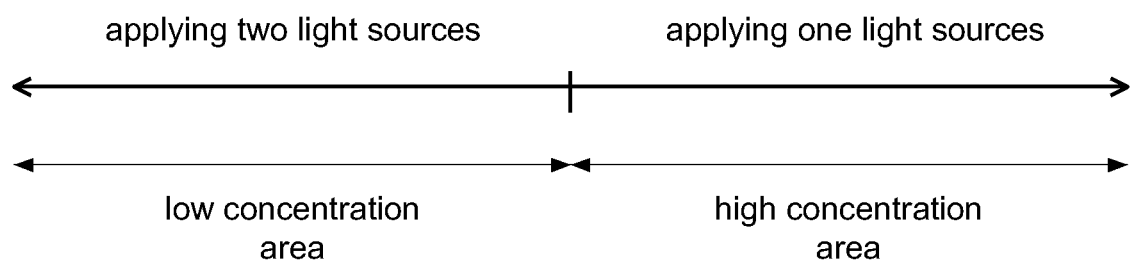
FIG. 2 is a view showing light emission setting for each area by dividing a concentration of an object to be measured into two-stage areas.

FIG. 2 is a view showing light emission setting for each area by dividing a concentration of an object to be measured into two-stage areas.

As shown in FIG. 2, in order to perform an optical analysis of an object to be measured 2 by the two-stage optical analysis device 100, a concentration state where light emission of the object to be measured 2 is saturated is set as a high concentration, and a concentration area including a saturation state in 0 of the object to be measured is divided into two, that is, the number of the light source units 10. A lowest concentration area is set as a low concentration area where the two light source units 10 emit light therefor, and a highest concentration area is set as a high concentration area where a single light source unit 10 emits light therefor.

As described above, after dividing a concentration area of an object to be measured, an optical analysis is performed according to a conventional method and the two-stage optical analysis device 100 of FIG. 1 as follows.

Figure 3:
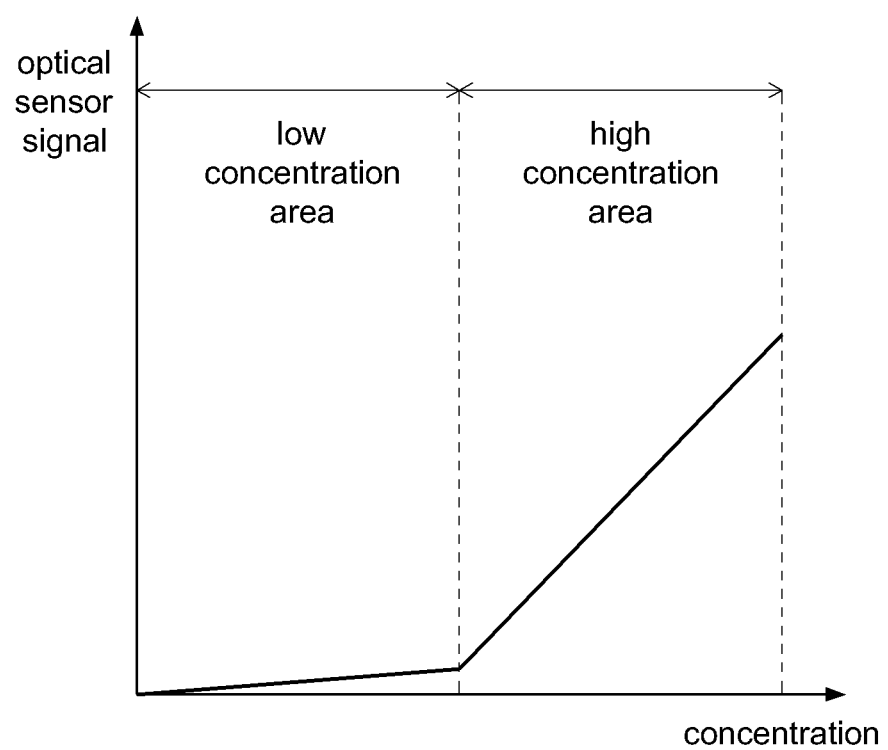
FIG. 3 is a view of an optical sensor signal measurement graph of an object to be measured having two-stage concentration areas measured by using a conventional single light source.

FIG. 3 is a view of an optical sensor signal measurement graph of an object to be measured having two-stage concentration areas which is measured by using a conventional single light source.

As shown in FIG. 3, when performing an optical analysis by using a single light source of the conventional method, a linear reaction signal may be obtained to some extent in a high concentration area, but a difference in size of a reaction signal according to a concentration difference is small since the size of the reaction light signal is small in a low concentration area. In other words, a resolution or resolving power according to a concentration of a reaction sample (object to be measured 2) becomes small in a low concentration area, and thus discrimination is degraded.

Figure 4:
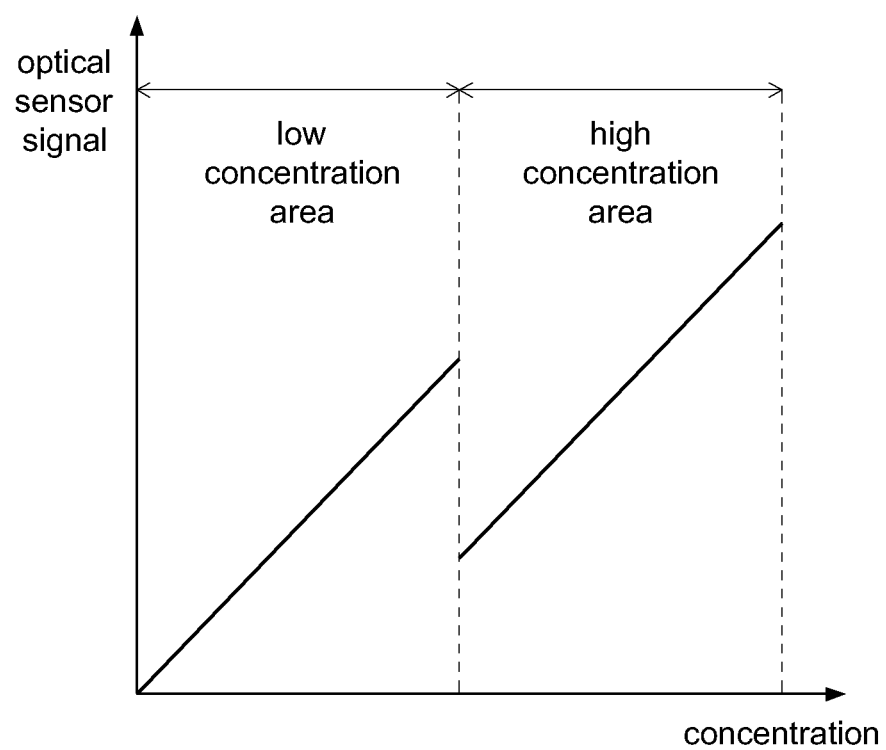
FIG. 4 is a view of an optical sensor signal measurement graph of an object to be measured having two-stage concentration areas measured by a controller 40 of the two-stage light emitting optical analysis device 100 of FIG. 1.

FIG. 4 is a view of an optical sensor signal measurement graph of an object to be measured having two-stage concentration areas which is measured by a controller 40 of the two-stage light emitting optical analysis device 100 of FIG. 1 which emit light in two-stages.

Unlike the conventional method of FIG. 3, in the two-stage light emitting optical analysis device 100 according to an embodiment of the present invention which selectively applies a number of light source units to two-stage concentrations of an object to be measured, as shown in FIG. 4, a reaction signal having linearity and large resolution may be obtained by operating a single light source unit 10 in a high concentration area. In addition, although an amount of reaction sample (object to be measured 2) is small in a low concentration area, and which is reacted by light emission of the two light source units 10 operating concurrently, reactivity becomes high by increasing a size of light amount of the light source that induces reaction. Accordingly, a size of an optical signal reacted in each concentration may be generally increased in a low concentration area, as well as, a size of an optical signal varying according to a concentration may be increased. Thus, a high and large-sized resolution may be obtained as a measurement result.

Figure 5:
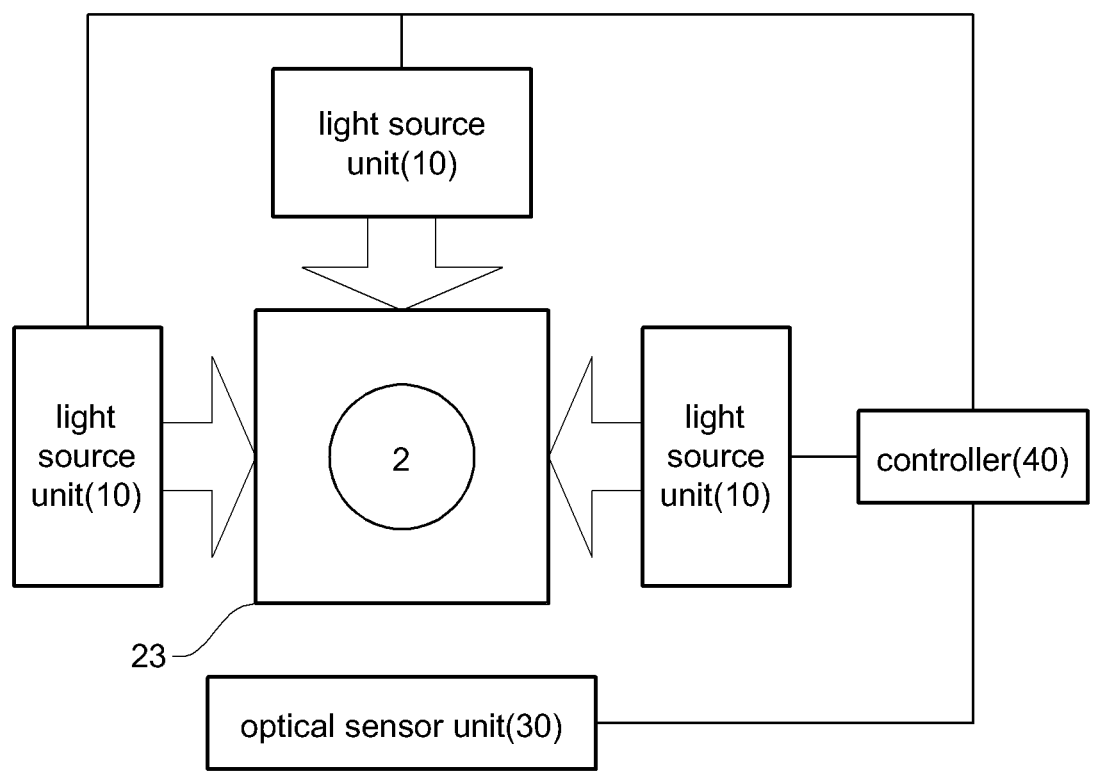
FIG. 5 is a configuration diagram of a three-stage light emitting optical analysis device 200 according to another embodiment of the present invention.

FIG. 5 is a three-stage light emitting optical analysis device 200 according to another embodiment of the present invention.

As shown FIG. 5, the three-stage light emitting optical analysis device 200 is configured with a multi-light source unit having three light source units 10, a quadrangular pillar cuvette 23 in which an object to be measured 2 is stored, an optical sensor unit 30, and a controller 40.

In the three-stage light emitting optical analysis device 200, configurations of the light source unit and the optical sensor unit 30 are identical with configurations of the light source unit 10 and the optical sensor unit 30 of the two-stage light emitting optical analysis device 100 described in FIGS. 1 to 4, and thus detailed descriptions thereof will be omitted, and configurations of the cuvette 23 and the controller 40 will be described.

The cuvette 23 is made of a quadrangular pillar that transmits light.

The controller 40 is configured to control the three light source units 10 constituting the multi-light source unit such that, for generating reaction light by an object to be measured, three light source units emit light for a low concentration of the object to be measured 2, two light source units emit light for an intermediate concentration of the object to be measured, and a single light source unit emits light for a high concentration of the object to be measured, and thus a three-stage measurement is performed where reaction light of the object to be measured has linearity in the low concentration area, in the intermediate concentration area, and in the high concentration area.

The light source unit 10 configured as above is installed to face three lateral surfaces of the quadrangular pillar cuvette 23, and the optical sensor unit 30 is installed to face the remaining lateral surface of the cuvette 23. In addition, the controller 40 is configured to control the light source units 10 to emit light by being connected thereto, and perform an optical analysis according to three-stage concentration areas of the object to be measured by receiving an optical detection signal of the optical sensor unit 30.

Figure 6:
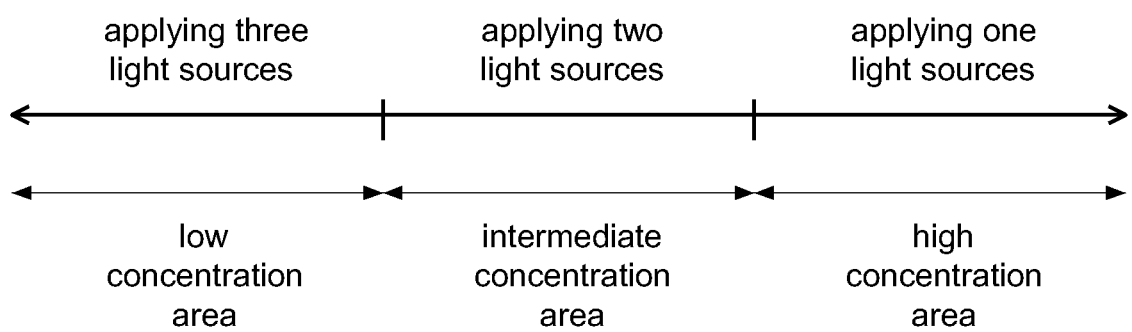
FIG. 6 is a view showing light emission setting for each area by dividing a concentration of an object to be measured into three-stage areas.

FIG. 6 is a view showing light emission setting for each area by dividing a concentration of an object to be measured into three-stage areas.

As shown in FIG. 6, in order to perform an optical analysis for an object to be measured by using the three-stage light emitting optical analysis device 200, a concentration state where light emission of the object to be measured 2 is saturated is set as a high concentration, and a concentration area including a saturation state in 0 of the object to be measured is divided into three, that is, the number of light source units 10. The area is divided such that a lowest concentration area is set as a low concentration area where three light source units 10 emit light therefor, an area where two light source units 10 emit light is set as an intermediate area, and an area including a high concentration is set as a high concentration area where a single light source unit 10 emits light therefor.

As described above, after dividing the concentration area of the object to be measured, an optical analysis is performed according to the conventional method and the three-stage light emitting optical analysis device 200 of FIG. 5 as follows.

Figure 7:
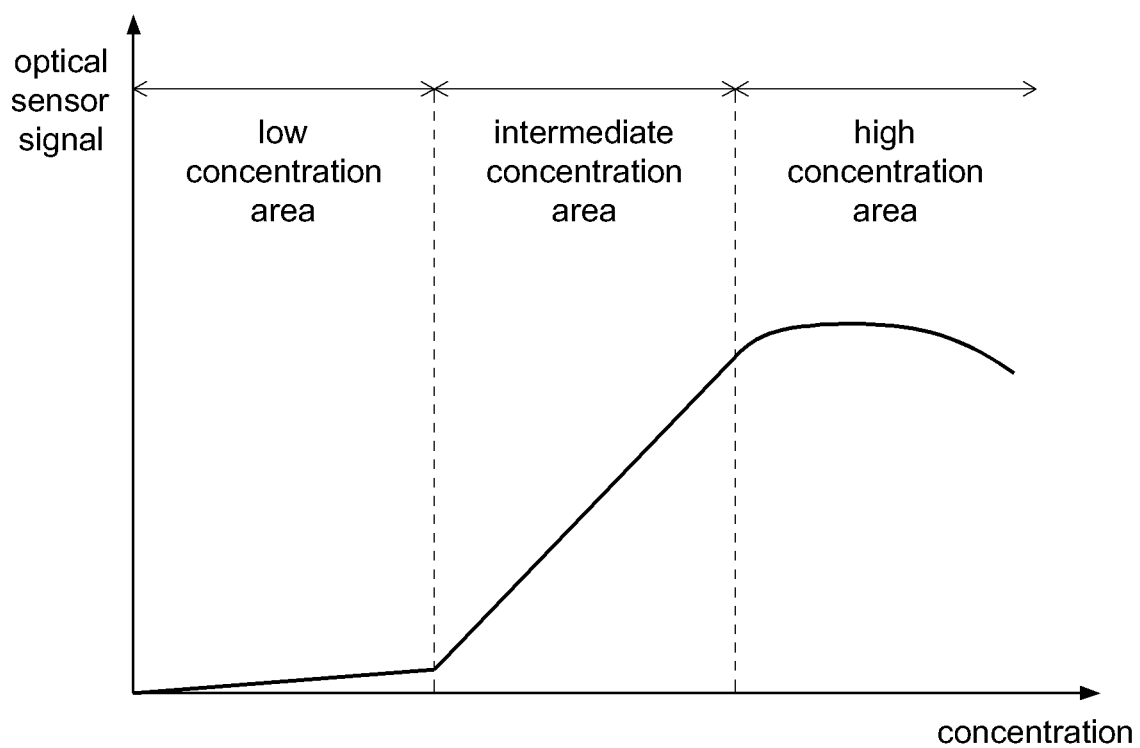
FIG. 7 is a view of an optical sensor signal measurement graph of an object to be measured having three-stage concentration areas measured by using a conventional single light source.

FIG. 7 is a view of an optical sensor signal measurement graph by using a single light source of the conventional method for an object to be measured having three-stage concentration areas.

As shown in FIG. 7, when performing an optical analysis by using a single light source of the conventional method, a linear result may be obtained in an intermediate concentration area. Meanwhile, a high concentration area becomes an area where measurement is impossible since the area becomes a saturation state as a reacted optical signal exceeds a measurement range of the optical sensor. In addition, a difference of an optical signal reacted according to a concentration is small in a low concentration area, and thus a resolution of the measurement result is degraded.

Figure 8:
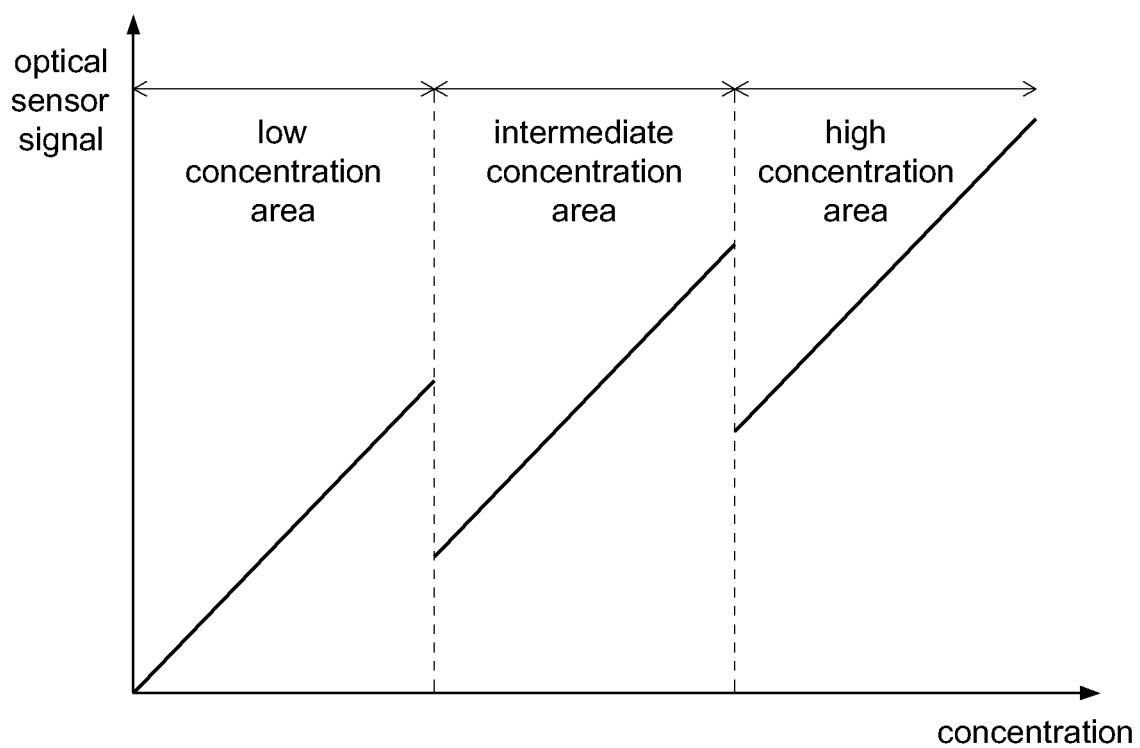
FIG. 8 is a view of an optical sensor signal measurement graph of an object to be measured having three-stage concentration areas measured by a controller 40 of the three-stage light emitting optical analysis device 200 of FIG. 5.

FIG. 8 is a view of an optical sensor signal measurement graph of the controller 40 of the three-stage light emitting optical analysis device 200 of FIG. 5 which emits light in three-stages for an object to be measured having three stage concentration areas.

Unlike the conventional method of FIG. 7, in the three-stage light emitting optical analysis device 100 according to an embodiment of the present invention which selectively applies a number of light source units to three-stage concentrations of an object to be measured, as shown in FIG. 8, a single light source unit 10 emits light for a high concentration area, two light source units 10 emit light for an intermediate concentration area, and three light source units 10 emit light for a low concentration area. Thus, a measurement result having linearity and large discrimination in all concentration sections may be obtained by optimizing optical intensity such that reactivity becomes maximum according to a concentration of a reacted object to be measured 2.

Figure 9:
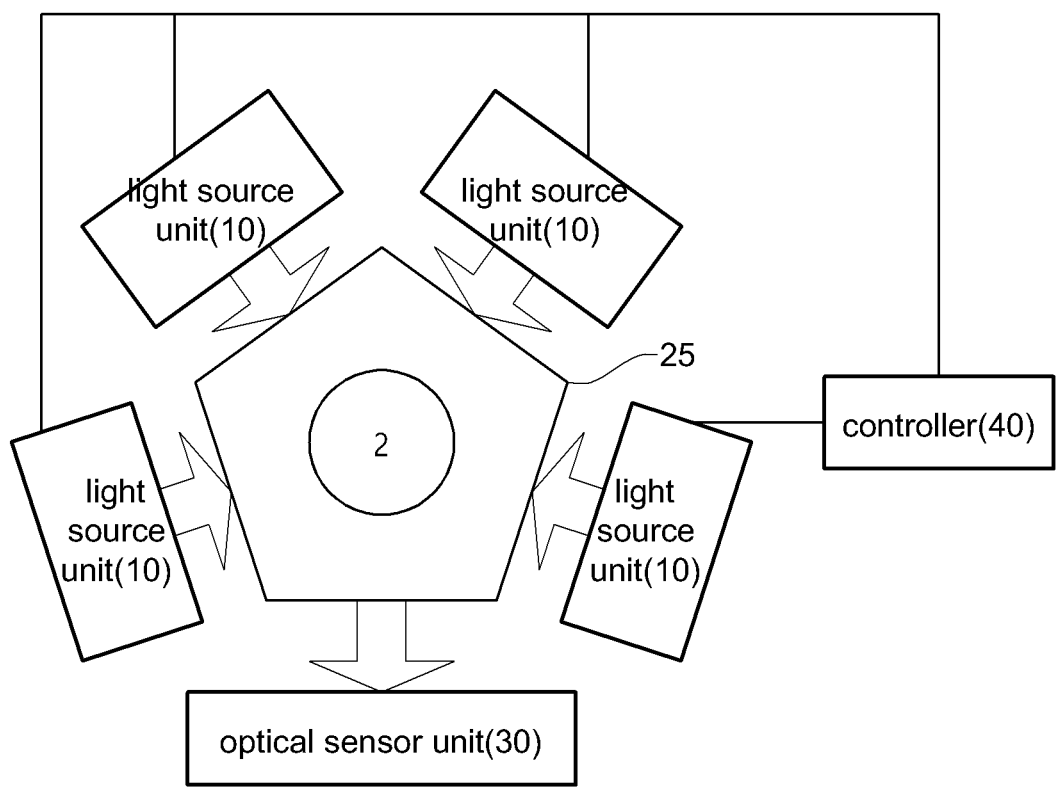
FIG. 9 is a configuration diagram of a four-stage light emitting optical analysis device 300 according to another embodiment of the present invention.

FIG. 9 is a block diagram of a four-stage light emitting optical analysis device 300 according to another embodiment of the present invention.

As shown FIG. 9, the four-stage light emitting optical analysis device 300 is configured with a multi-light source unit having four light source units 10, a pentagonal pillar cuvette 25 in which an object to be measured 2 is stored, an optical sensor unit 30, and a controller 40.

In the four-stage light emitting optical analysis device 300, configurations of the light source unit 10 and the optical sensor unit 30 are identical with configurations of the light source unit 10 and the optical sensor unit 30 of the two-stage light emitting optical analysis device 100 described in FIGS. 1 to 4, and thus detailed descriptions thereof will be omitted, and configurations of the cuvette 25 and the controller 40 will be described.

The cuvette 25 is made of a pentagonal pillar that transmits light.

The controller 40 is configured to control the four light source units 10 constituting the multi-light source unit such that, for generating reaction light by an object to be measured, four light source units emit light for a lowest concentration of an object to be measured 2, three light source units emit light for a low concentration of the object to be measured 2, two light source units emit light for an intermediate concentration of the object to be measured, and a single light source unit emits light for a high concentration of the object to be measured. Thus, a four-stage measurement is performed where reaction light of the object to be measured has linearity in the lowest low concentration area, in the low concentration area, in the intermediate concentration area, and in the high concentration area.

The light source unit 10 having the above configuration is installed to face four lateral surfaces of the pentagonal pillar cuvette 25, and the optical sensor unit 30 is installed to face the remaining lateral surface of the cuvette 25. In addition, the controller 40 is configured to control the light source units 10 to emit light by being connected thereto, and perform an optical analysis according to four-stage concentration areas of the object to be measured by receiving an optical detection signal of the optical sensor unit 30.

Figure 10:
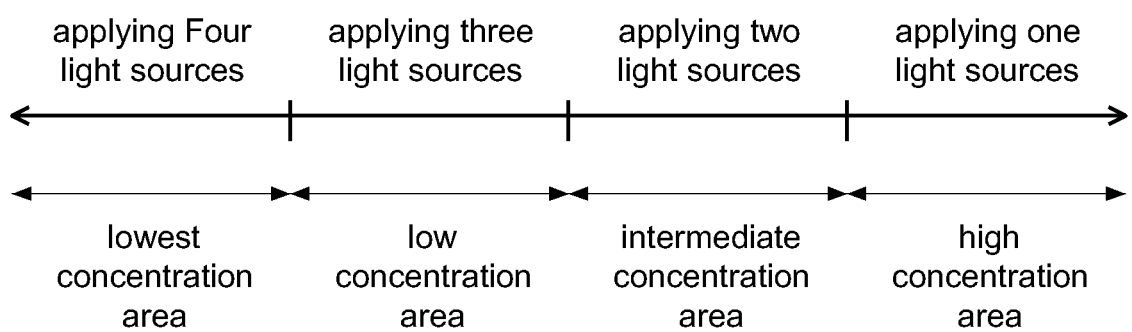
FIG. 10 is a view showing light emission setting for each area by dividing a concentration of an object to be measured into four-stage areas.

FIG. 10 is a view showing light emission setting for each area by dividing a concentration of an object to be measured into four-stage areas.

As shown in FIG. 10, in order to perform an optical analysis for an object to be measured 2 by using the four-stage light emitting optical analysis device 300, a concentration state where light emission of the object to be measured 2 is saturated is set as a high concentration, and a concentration area including a saturation state in 0 of the object to be measured is divided into four, that is, the number of light source units 10. The area is divided such that a lowest concentration area is set as a lowest concentration area where four light source units 10 emit light therefor, an area where three light source units 10 emit light therefor is set as a low concentration area, an area where two light source units 10 emit light therefor is set as an intermediate area, and an area including a high concentration where a single light source unit 10 emits light therefor is set as a high concentration area.

As described above, after dividing a concentration area of the object to be measured, an optical analysis is performed according to the conventional method and the four-stage optical analysis device 300 of FIG. 9 as follows.

Figure 11:
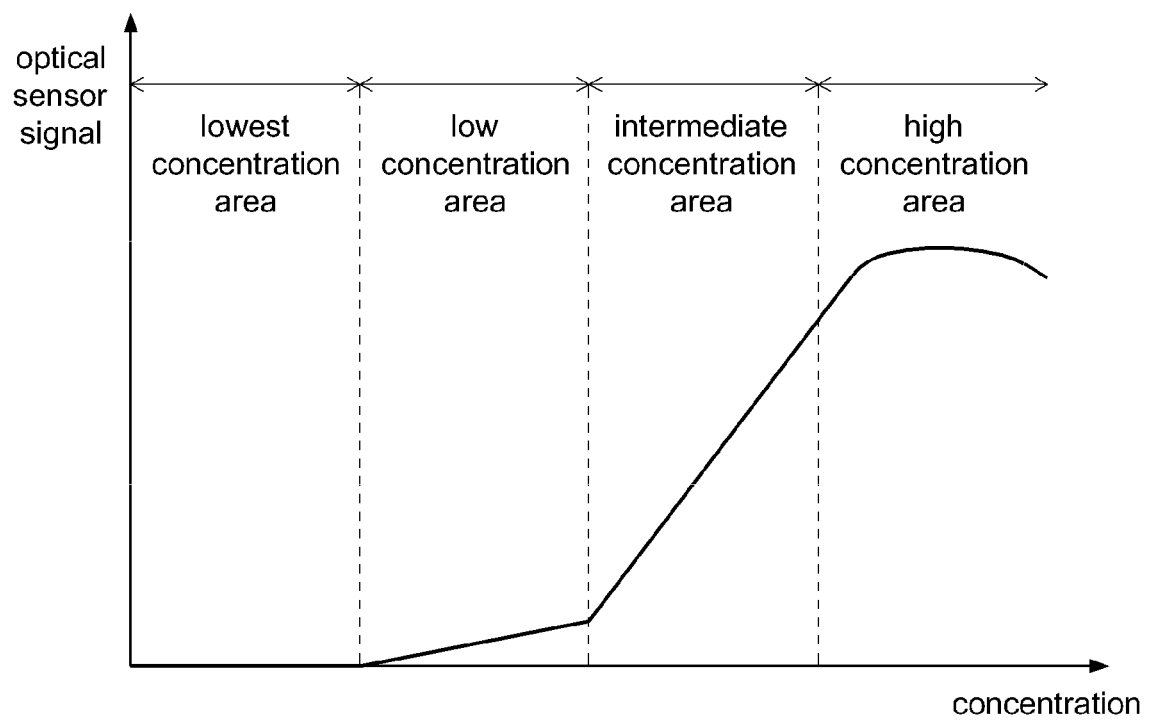
FIG. 11 is a view of an optical sensor signal measurement graph of an object to be measured having four-stage concentration areas measured by using a conventional single light source.

FIG. 11 is a view of an optical sensor signal measurement graph by using a single light source of the conventional method for an object to be measured having four-stage concentration areas.

As shown in FIG. 11, when performing an optical analysis by using a single light source of the conventional method, a linear result may be obtained in an intermediate concentration area. Meanwhile, a high concentration area becomes an area where a measurement is impossible since the area becomes a saturation state as a reacted optical signal exceeds a measurement range of the optical sensor. In addition, in case of a lowest concentration area and a low concentration area, a difference of an optical signal reacted according to a concentration is small, and thus a resolution of a measurement result is degraded.

Figure 12:
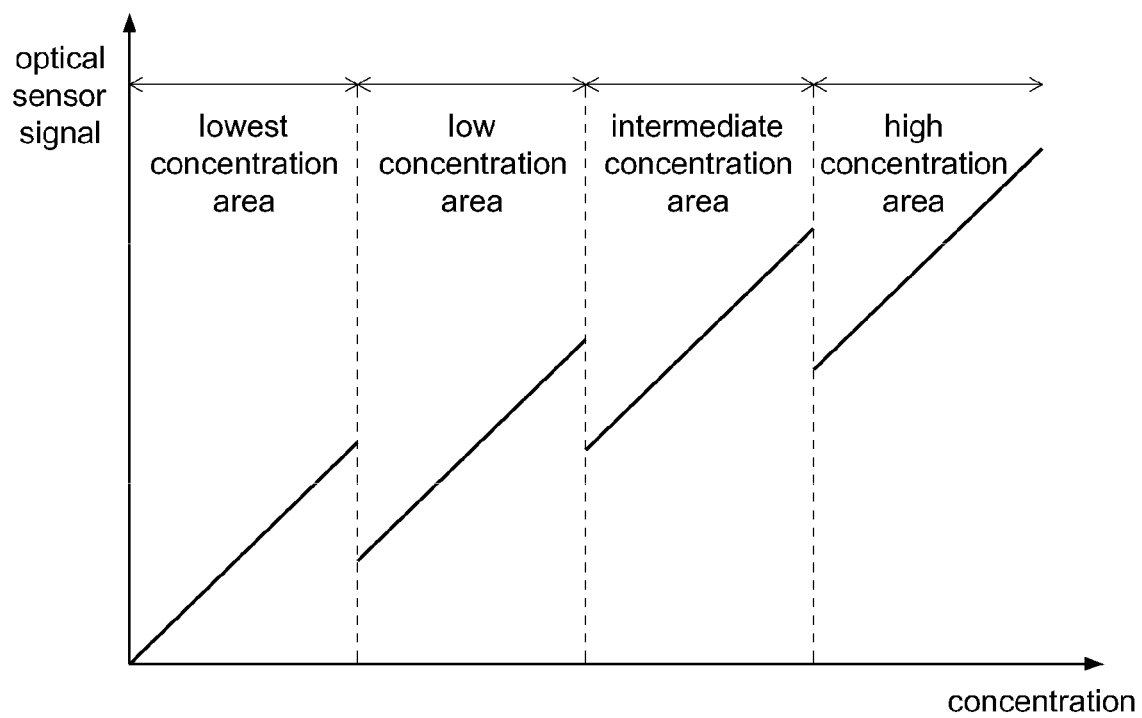
FIG. 12 is a view of an optical sensor signal measurement graph of an object to be measured having four-stage concentration areas measured by a controller 40 of the four-stage light emitting optical analysis device 300 of FIG. 9.

FIG. 12 is a view of an optical sensor signal measurement graph of the controller 40 of the four-stage light emitting optical analysis device 300 of FIG. 9 which emits light in four-stages for an object to be measured having four-stage concentration areas.

Unlike the conventional method of FIG. 11, in the four-stage light emitting optical analysis device 300 according to an embodiment of the present invention which selectively applies a number of light source units to each of four-stage concentrations of an object to be measured, as shown in FIG. 12, a single light source unit 10 emits light for a high concentration area, two light source units 10 emit light for an intermediate concentration area, three light source units 10 emit light for a low concentration area, and four light source units 10 emit light for a lowest concentration area. Thus, a measurement result having linearity and large discrimination in all concentration sections may be obtained by optimizing optical intensity such that reactivity becomes maximum according to a concentration of an object to be measured 2.

In embodiments of the present invention shown in FIGS. 1 to 12, description has been made where the cuvette is formed in a triangular pillar, a quadrangular pillar, and a pentagonal pillar and the number of light source units 10 is configured to be two, three, and four. However, the present invention may find application in that the cuvette is formed in a polygonal pillar such as hexagonal pillar, etc. and the number of light source units 10 is one less than the number of lateral surfaces of the polygonal pillar. In addition, forming the cuvette in a polygonal pillar is to improve reactivity where light incident on the object to be measured is vertically incident on lateral surfaces of the polygonal pillar so that interference such as light reflection or light deflection is minimized.

Figure 13:
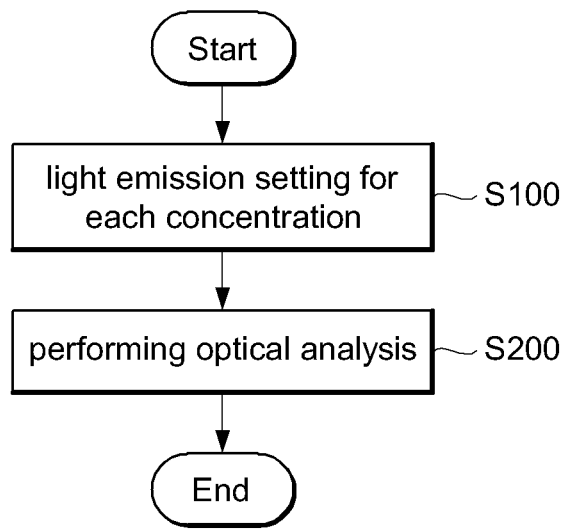
FIG. 13 is a view of a flowchart showing an optical analysis method of an optical analysis device configured with a multi-light source structure of the present invention.

FIG. 13 is a view of a flowchart showing an optical analysis method of an optical analysis device configured with a multi-light source structure of the present invention.

As shown in FIG. 13, an optical analysis method using with a multi-light source structure of the present invention, wherein the optical analysis method is performed by an optical analysis device including a multi-light source unit, a cuvette unit, an optical sensor, and a controller, includes: a step S100 of setting light emission for each concentration, and a step S200 of performing an optical analysis.

In S100 of setting light emission for each concentration, the controller 40 sets a case where reaction light is saturated as a high concentration, uniformly divides a concentration area according to a number of light source units, and sets a number of the light source units 10 that will emit light in inverse proportion to a concentration according to the uniformly divided area. Herein, a saturation concentration value may be input by a user.

In S200 of performing an optical analysis, the controller 40 performs an optical analysis by controlling the light source units 10 to sequentially emit light for each concentration according to S100 of setting light emission for each concentration.

In detail, in S200 of performing an optical analysis, when a number of areas obtained by uniformly dividing a concentration area of an object to be measured 2 is n, n light source units emit light for a lowest concentration, a number of light source units emitting light is decreased by 1 depending on each area, and a single light source unit 10 emits light for a high concentration area where reaction light is saturated. Accordingly, an optical analysis is performed by using a number of light source units differing for each concentration area of the object to be measured.

Although the foregoing description has been made with reference to the preferred embodiments, it is to be understood that changes and modifications of the present invention may be made by the ordinary skilled in the art without departing from the spirit and scope of the present invention and appended claims. Thus, to the maximum extent allowed by law, the scope of the present invention is to be determined by the broadest permissible interpretation of the following claims and their equivalents.

INDUSTRIAL APPLICABILITY

The present invention can be applied to a geological resource analysis industry.

The invention claimed is:

1. An optical analysis device using multi-light source structure, the device comprising:
   a multi-light source including a number of light sources,
   a cuvette having a pillar form, the pillar having one more lateral surface than the number of light sources, facing the number of light sources at lateral surfaces thereof, and configured to store an object where reaction light occurring in the object passes through a remaining one lateral surface thereof;
   an optical sensor configured to detect a reaction light output from the object through the cuvette, and to measure a concentration of a fluorescent substance in the object; and
   a controller configured to control on-off states of the light sources constituting the multi-light source according to the concentration of the fluorescent substance in the object.

2. The device of claim 1, wherein
   the multi-light source includes two light sources,
   the cuvette is formed in a triangular pillar, and
   the controller is configured to control the multi-light source such that two light sources emit light so as to generate reaction light by the object if the object belongs to a second concentration area, a single light source emits light so as to generate reaction light by the object if the object belongs to a fourth concentration area, and thus a two-stage measurement is performed where the reaction light has linearity in the second concentration area and the fourth concentration area of the object,
   wherein a concentration area of the object is uniformly divided into two, an area with a second concentration is set as the second concentration area and an area with a fourth concentration is set as the fourth concentration area, the second concentration having a lower concentration than the fourth concentration, and
   when the object belongs to the second concentration area, the object is classified into the second concentration, and
   when the object belongs to the fourth concentration area, the object is classified into the fourth concentration.

3. The device of claim 1, wherein the multi-light source includes three light sources, the cuvette is formed in a quadrangular pillar, and the controller is configured to control the multi-light source such that three light sources emit light so as to generate reaction light by the object if the object belongs to a second concentration area, two light sources emit light so as to generate reaction light by the object if the object belongs to an third concentration area, a single light source emits light so as to generate reaction light of the object if the object belongs to a fourth concentration area, and thus a three-stage measurement is performed where the reaction light is measured in three concentration sections, and the measured reaction light has linearity in the three concentration sections,
   wherein a concentration area of the object is uniformly divided into three, and an area with a second concentration is set as the second concentration area, an area with a third concentration is set as the third concentration area, and an area with a fourth concentration is set as the fourth concentration area, where the second concentration has a lower concentration than the third concentration and the third concentration has a lower concentration that the fourth concentration,
   when the object belongs to the second concentration area, the object is classified into the second concentration,
   when the object belongs to the third concentration area, the object is classified into the third concentration, and
   when the object belongs to the fourth concentration area, the object is classified into the fourth concentration.

4. The device of claim 1, wherein the multi-light source includes four light sources, the cuvette is formed in a pentagonal pillar, and the controller is configured to control the multi-light source such that four light sources emit light so as to generate reaction light by the object if the object belongs to a first concentration area, three light sources emit light so as to generate reaction light by the object if the object belongs to a second concentration area, two light sources emit light so as to generate reaction light by the object if the object belongs to an third concentration area, a single light source emits light so as to generate reaction light of the object if the object belongs to a fourth concentration area, and thus a four-stage measurement is performed where the reaction light is measured in four concentration sections, and the measured reaction light has linearity in the four concentration sections,
   wherein a concentration area of the object is uniformly divided into four, and an area with a first concentration is set as the first concentration area, an area with a second concentration is set as the second concentration area, an area with a third concentration is set as the third concentration area, and an area with a fourth concentration is set as the fourth concentration area, such that the first concentration has a lower concentration than the second concentration, the second concentration has a lower concentration than the third concentration, and the third concentration has a lower concentration than the fourth concentration,
   when the object belongs to the first concentration area, the object is classified into the first concentration,
   when the object belongs to the second concentration area, the object is classified into the second concentration,
   when the object belongs to the third concentration area, the object is classified into the third concentration, and
   when the object belongs to the fourth concentration area, the object is classified into the fourth concentration.

5. An optical analysis method using multi-light source structure, wherein the method is performed by an optical analysis device of claim 1, the method comprising:
- light emission setting for each concentration of dividing, by the controller, a measurement concentration area of the object, and selecting a light source emitting light for each concentration; and
- performing, by the controller, an optical analysis by controlling the light source to sequentially emit light according to the light emission setting for each concentration.

6. The method of claim 5, wherein in the light emission setting for each concentration, a case where reaction light is saturated is set as a fourth concentration, and the concentration area is uniformly divided into a number of the light sources.

7. The method of claim 5, wherein in the performing of the optical analysis, when an uniformly divided concentration areas is n, a number n of light sources emit light for a lowest concentration, the number n is decreased by one depending one each area, and a single light source unit emits light for a fourth concentration where reaction light is saturated, and thus the optical analysis is performed by using the number n of light sources differing for each concentration area of the object.

* * * * *